United States Patent
Thiele et al.

(10) Patent No.: US 10,127,180 B2
(45) Date of Patent: Nov. 13, 2018

(54) BUS INTERFACE UNIT AND OPERATING METHOD THEREFOR

(71) Applicant: Robert Bosch GmbH, Stuttgart (DE)

(72) Inventors: Stefan Thiele, Reutlingen (DE); Christoph Hufen, Backnang (DE); Stefan Kreuz, Stuttgart (DE); Herbert Leuwer, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 239 days.

(21) Appl. No.: 14/680,855

(22) Filed: Apr. 7, 2015

(65) Prior Publication Data

US 2015/0301976 A1  Oct. 22, 2015

(30) Foreign Application Priority Data

Apr. 17, 2014  (DE) .......... 10 2014 207 422

(51) Int. Cl.
| | |
|---|---|
| *G06F 13/12* | (2006.01) |
| *G06F 13/42* | (2006.01) |
| *G06F 13/22* | (2006.01) |
| *H04L 12/861* | (2013.01) |
| *H04L 29/06* | (2006.01) |

(52) U.S. Cl.
CPC ........ *G06F 13/4221* (2013.01); *G06F 13/128* (2013.01); *G06F 13/22* (2013.01); *H04L 49/9042* (2013.01); *H04L 69/22* (2013.01)

(58) Field of Classification Search
CPC .... G06F 13/4221; G06F 21/10; G06F 3/0484; G06F 13/128; H04L 49/9042; H04L 69/22
See application file for complete search history.

(56) References Cited

U.S. PATENT DOCUMENTS

| | | | |
|---|---|---|---|
| 2004/0120340 A1* | 6/2004 | Furey .............. | H04L 69/22 370/429 |
| 2009/0024775 A1* | 1/2009 | Costin ............. | G05B 19/0428 710/107 |
| 2013/0145482 A1* | 6/2013 | Ricci .............. | G06F 9/54 726/28 |

OTHER PUBLICATIONS

"M_CAN IP module" of Robert Bosch GmbH, cf. the Internet publication http://www.bosch-semiconductors.de/media/en/pdf_1/ipmodules_1/m_can/bosch_product_info_m_can_ip.pdf.

"E-Ray IP module" of Robert Bosch GmbH, cf. the Internet publication http://www.bosch-semiconductors.de/media/en/pdf_l/ipmodules_l/flexray/eray_users_manual_1_2_7.pdf.

\* cited by examiner

*Primary Examiner* — Ernest Unelus
(74) *Attorney, Agent, or Firm* — Norton Rose Fulbright US LLP (57) ABSTRACT

A bus interface unit for exchanging data via a bus system includes at least one bus control unit for connection to the bus system, having a control unit that is configured to output data received via the bus control unit from the bus system, and/or data derived therefrom, to an external unit, and/or to output data obtained from an external unit, and/or data derived therefrom, via the bus control unit to the bus system.

15 Claims, 8 Drawing Sheets

BUS INTERFACE UNIT AND OPERATING
METHOD THEREFOR

RELATED APPLICATION INFORMATION

The present application claims priority to and the benefit of German patent application no. 10 2014 207 422.3, which was filed in Germany on Apr. 17, 2014, the disclosure of which is incorporated herein by reference.

FIELD OF THE INVENTION

The present invention relates to a bus interface unit for exchanging data via a bus system, the bus interface unit having at least one bus control unit for connection to the bus system. The present invention further relates to a corresponding operating method for a bus interface unit of this kind.

BACKGROUND INFORMATION

Bus control units of the kind recited above are believed to be understood, and are also referred to as "bus controllers." Known bus controllers are usually connected to a standardized processor bus of a microprocessor or the like, and are often operated in software-controlled fashion under the control of the microprocessor. Disadvantages of the known systems are the comparatively high jitter (variance in execution times/processing times in the context of data processing) due to the use of software, and low throughput.

SUMMARY OF THE INVENTION

An object of the present invention is accordingly to describe an improved bus interface unit and an improved operating method therefor, which exhibit the aforementioned disadvantages to a lesser extent or not at all.

This object may be achieved according to the present invention, in the context of the bus interface unit of the kind recited above, in that a control unit is provided which is configured to output data received via the bus control unit from the bus system, and/or data derived therefrom, to an external unit, and/or to output data obtained from an external unit, and/or data derived therefrom, via the bus control unit to the bus system. Provision of the control unit according to the present invention advantageously makes it possible for functionalities that are important for data processing to be localized in the bus interface unit itself, so that the load on an external unit, for example a processor connected to the bus interface unit, is relieved, and the disadvantages of the existing art can be diminished or entirely avoided. In particular, if the control unit is implemented by way of hardware, in accordance with an exemplary embodiment, the aforementioned disadvantages of conventional systems are eliminated. Even with other variants, however, in which the bus control unit is implemented at least in part in hardware, the advantages of the present invention exist as compared with a conventional architecture in which the external unit communicates with the bus interface unit via a conventional processor bus, for example by polling or another software-controlled method.

In an exemplary embodiment, provision is made that the control unit is configured to exchange data with the external unit in the form of one or more data segments, in particular data segments of constant length. A deterministic run time or processing time for the data segments in the external unit is thereby possible.

In an exemplary embodiment, provision is made that the bus system is a controller area network (CAN) bus system; and that the bus control unit is a CAN bus control unit. Particularly, according to an embodiment, the CAN bus control unit can be configured as a standalone CAN controller, e.g. in the form of a separate integrated circuit (IC), or also as an application-specific integrated circuit (ASIC) or part of an ASIC, or as a programmable logic circuit (FPGA) or part of an FPGA. In an embodiment, the CAN bus control unit can also be implemented on the basis of the "M_CAN IP module" of Robert Bosch GmbH, cf. the Internet publication http://www.bosch-semiconductors.de/media/en/pdf_1/ipmodules_1/m_can/bosch_product_info_m_can_i-p.pdf.

In a further exemplary embodiment, provision is made that the bus system is a FlexRay bus system; and that the bus control unit is a FlexRay bus control unit. Similarly to the CAN controller embodiment described above, in the case of FlexRay bus system as well, in accordance with an embodiment the FlexRay bus control unit can be configured as a standalone FlexRay controller, e.g. in the form of a separate integrated circuit (IC), or also as an application-specific integrated circuit (ASIC) or part of an ASIC, or as a programmable logic circuit (FPGA) or part of an FPGA. In an embodiment, the FlexRay bus control unit can also be implemented on the basis of the "E-Ray IP module" of Robert Bosch GmbH, cf. the Internet publication http://www.bosch-semiconductors.de/media/en/pdf_1/ipmodules_1/flexray/eray_users_manual_1_2_7.pdf.

In a further embodiment, the bus system can also be configured as a local interconnect network (LIN), and the bus control unit is a LIN bus control unit.

In a further embodiment, provision is made that the control unit is configured to receive control data and/or configuration data from the external unit, with the result that the control unit according to the present invention becomes capable of conveying the control data and/or configuration data of the relevant bus control unit directly, in particular independently of or in a manner decoupled from a further operating mode of the external unit. The control data and/or configuration data can in that fashion be conveyed to the bus control unit, for example, in those operating states in which data communication via the bus system experiences particularly little impairment due to the transfer of control data and/or configuration data.

For example, in accordance with an embodiment in the context of an embodiment of a CAN bus control unit, the control unit can be configured, on the basis of the "M_CAN IP module" described above, to access memory registers or configuration registers of the M_CAN IP module, e.g. in order to write into the CAN bus control unit, or into its register, control data and/or configuration data obtained from the external unit.

Further by way of example, in accordance with an embodiment in the context of an embodiment of a FlexRay bus control unit, the control unit can be configured, on the basis of the "E-Ray IP module" described above, to access memory registers or configuration registers of the E_Ray IP module, e.g. in order to write into the FlexRay bus control unit, or into its register, control data and/or configuration data obtained from the external unit.

In a further embodiment, provision is made that the control unit is configured to receive information characterizing an operating state of the bus control unit, in particular status information and/or event information, from the bus control unit, and to output the information characterizing the operating state of the bus control unit, at least in part, to the external unit, the information characterizing the operating state of the bus control unit being buffered, i.e. at least temporarily stored, in particular in the control unit.

In a further embodiment, provision is made that the control unit, which may be the entire bus interface unit, is implemented by way of or in the form of hardware, in particular as an application-specific integrated circuit (ASIC) or a programmable logic circuit (FPGA), or as part thereof. The result in this case is particularly short data processing times, and in particular a predictable processing time or throughput time for data through the control unit or bus interface unit according to the present invention, which has a positive effect on high-performance further processing of data in the external unit.

A method for operating a bus interface unit for exchanging data via a bus system is described as a further manner of achieving the object of the present invention, the bus interface unit having at least one bus control unit for connection to the bus system, wherein a control unit is provided; and the control unit outputs data received via the bus control unit from the bus system, and/or data derived therefrom, to an external unit; and/or the control unit outputs data obtained from an external unit, and/or data derived therefrom, via the bus control unit to the bus system.

Advantageous embodiments are the subject matter of the further descriptions herein.

Exemplifying embodiments of the invention are described in detail below with reference to the drawings.

DETAILED DESCRIPTION

Figure 1:
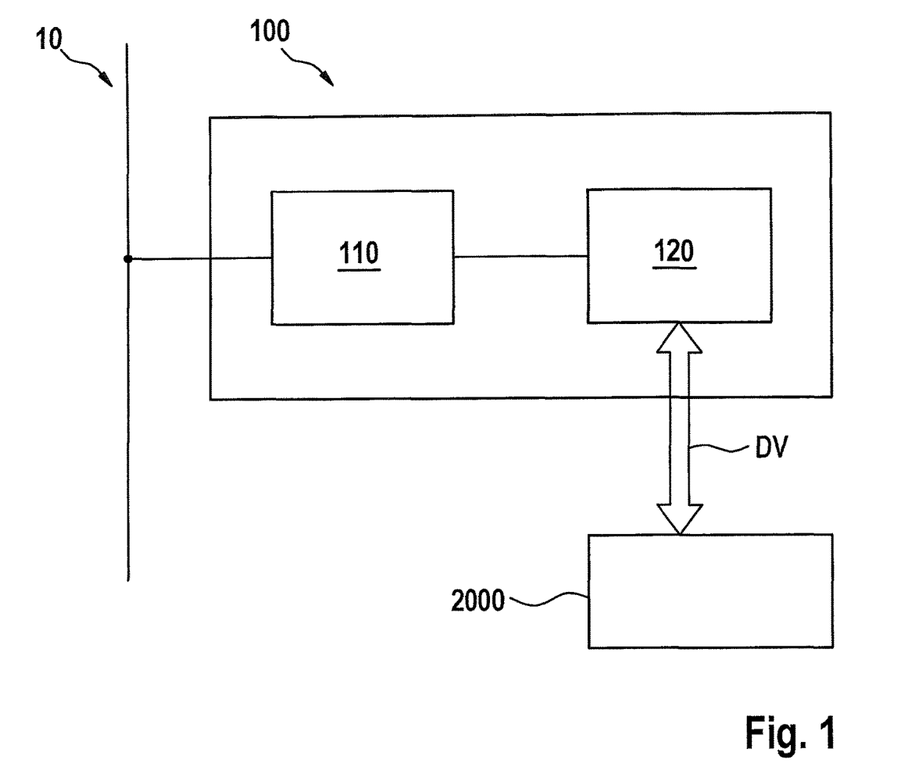
FIG. 1 schematically shows a bus interface unit according to a first embodiment.

FIG. 1 schematically shows a bus interface unit 100 according to a first embodiment. Bus interface unit 100 serves to exchange data via a bus system 10. In this manner, for example, an external unit 2000 can transfer (receive and/or send) data via bus system 10 using bus interface unit 100. External unit 2000, which is not a subject of the present invention, can be, for example, a computation unit of a control device (not shown), in particular of a motor vehicle, or also a gateway device or the like that is provided in order to forward data to other devices or to exchange data among multiple devices.

According to the present invention, bus interface unit 100 has a bus control unit 110 that is provided for connection to bus system 10 and can also be referred to as a "bus controller." According to the present invention bus interface unit 100 further has a control unit 120, to be distinguished from bus control unit 110, that is configured to output data received via bus control unit 110 from bus system 10, and/or data derived therefrom, to external unit 2000, and/or to output data obtained from external unit 2000, and/or data derived therefrom, via bus control unit 110 to bus system 10.

Figure 6:
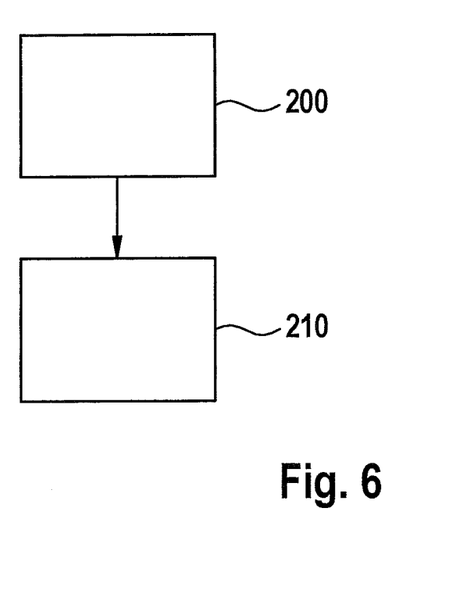
FIG. 6 schematically shows a flow chart according to an embodiment.

FIG. 6 schematically shows in this regard a simplified flow chart of an embodiment of the method according to the present invention. In step 200, bus control unit 110 (FIG. 1) receives, via bus system 10, data that have been sent out from another bus subscriber (not shown) of bus system 10. In step 210 (FIG. 2), control unit 120 outputs to external unit 2000 the data received in step 200.

In an embodiment, a corresponding data connection DV between control unit 120 or in general bus interface unit 100 on the other hand, and external unit 2000 on the other hand, can encompass one or more (dedicated) data lines or address and/or data buses, so that more efficient and higher-performance data exchange between components 120 or 100 and 2000 is possible.

In a further embodiment, provision is made that control unit 120, but which may be the entire bus interface unit 100, is implemented by way of or in the form of hardware, in particular as an application-specific integrated circuit (ASIC) or programmable logic circuit (FPGA), or as a part thereof. This results in particularly short data processing times and in particular in a predictable processing time or throughput time for data through control unit 120 or bus interface unit 100 according to the present invention, which has a positive effect on high-performance further processing of data in external unit 2000. For example, the functionality of bus control unit 110 can be implemented in the same FPGA as the functionality of control unit 120. In a further embodiment, the functionality of components 110, 120, or generally of component 100, can also be integrated into, for example, the same FPGA as external unit 2000.

Figure 2:
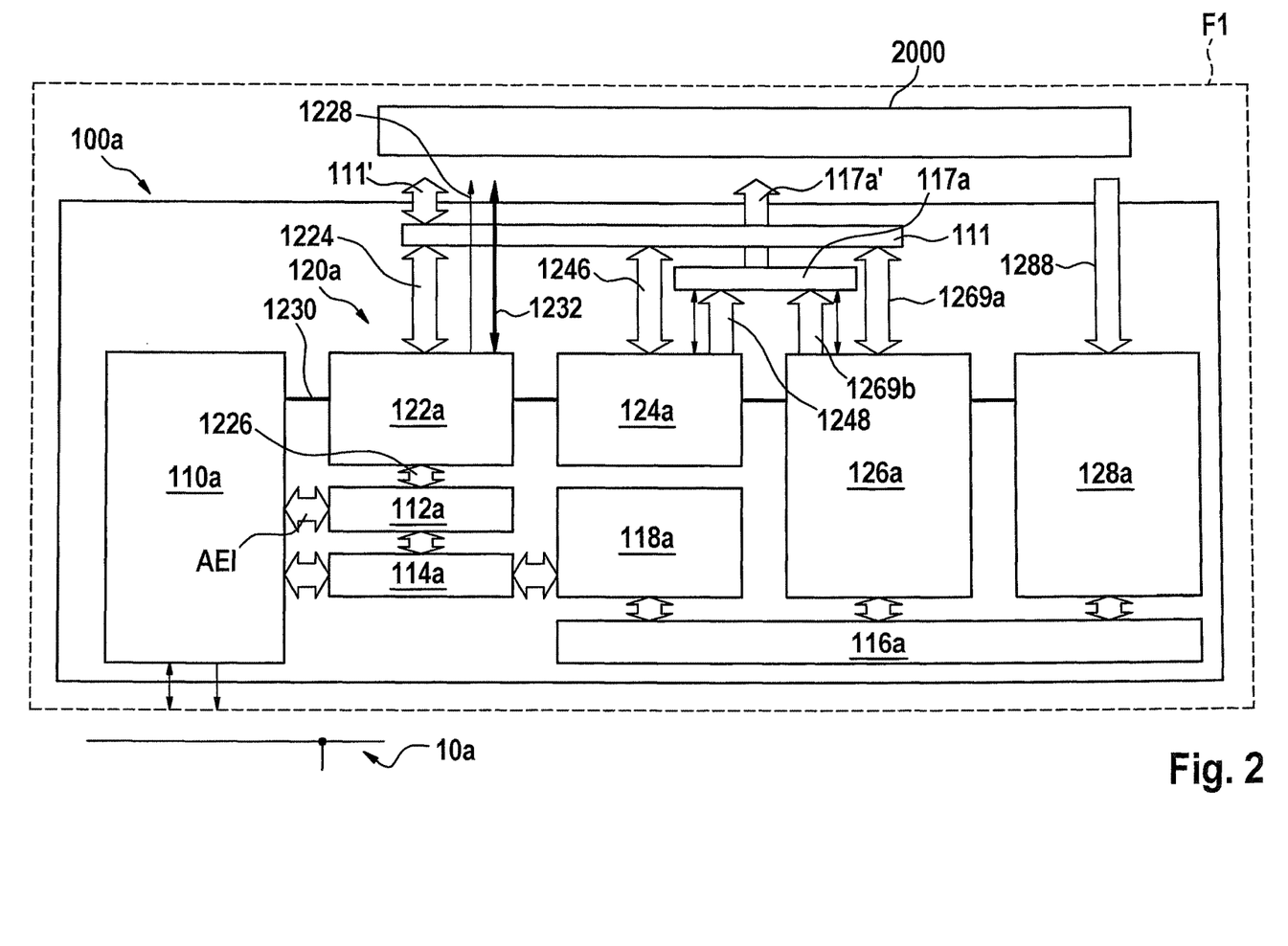
FIG. 2 schematically shows a bus interface unit according to a second embodiment.

FIG. 2 schematically shows a bus interface unit 100a in accordance with a second embodiment. Bus interface unit 100a is connected to a bus system 10a configured as a CAN bus, and is configured to output data received via bus control unit 110a from CAN bus 10a, and/or data derived therefrom, to external unit 2000, and/or to output data obtained from external unit 2000, and/or data derived therefrom, via bus control unit 110a to CAN bus 10a. Data exchange between bus interface unit 100a and external unit 2000 is indicated in FIG. 2 by multiple arrows 1228 and block arrows 111', 117a', 1288, and is described in further detail below.

Bus control unit 110a of bus interface unit 100a is implemented in the present case on the basis of the "M_CAN IP module" of Robert Bosch GmbH already described above, which is configured to perform communication compatibly with ISO standard 11898-1 on a CAN bus system 10a. Alternatively, a different CAN controller 110a can also be used. The functionality of the M_CAN IP module, and in particular of the entire bus interface unit 110a, may be implemented particularly in the form of part of a field programmable gate array (FPGA) F1, FPGA F1 also, in the present case, implementing at least in part the functionality of external unit 2000. This is indicated in FIG. 2 by the dashed line, labeled with the reference character F1, around units 100a, 2000. Integration of both bus interface unit 100a and external unit 2000 in the same FPGA F1 yields particularly efficient possibilities for data transfer between units 100a, 2000, since FPGA-internal bus systems and data transfer systems can be utilized. In the case of FPGA models manufactured by Altera, for example, the so-called Avalon interfaces of Altera FPGAs, which enable efficient data connection among multiple components or units disposed in the same FPGA F1, can be utilized. It particularly may be the case to use in the context of FPGA F1, for example, the interface of the "Avalon Memory Mapped Interface" (Avalon-MM) type in order to establish a data connection between parts of units 100a, 2000.

In the configuration illustrated in FIG. 2, the functionality of control unit 120a according to the present invention (see also reference character 120 of FIG. 1) is distributed among several functional blocks, namely substantially functional blocks 122a, 124a, 126a, 128a, which will be explained in further detail below.

In an advantageous embodiment, first functional block 122a, which can also be referred to as "host service" and is configured to control an operating mode of bus interface unit 100a, is provided. First functional block 122a can be configured in particular to receive control data and/or configuration data from external unit 2000, thereby rendering control unit 120a according to the present invention capable of conveying the control data and/or configuration data directly to bus control unit 110a, in particular independently of or in a manner decoupled from a further operating mode of external unit 2000. The control data and/or configuration data can in that fashion be conveyed to bus control unit 110a, for example, in those operating states in which data communication via CAN bus 10a experiences particularly little impairment due to the transfer of control data and/or configuration data.

According to an embodiment, the aforesaid control data can encompass, for example, control instructions that initiate a start or a shutdown/deactivation of bus control unit 110a, and/or another change between operating states of bus control unit 110a.

Figure 3A:
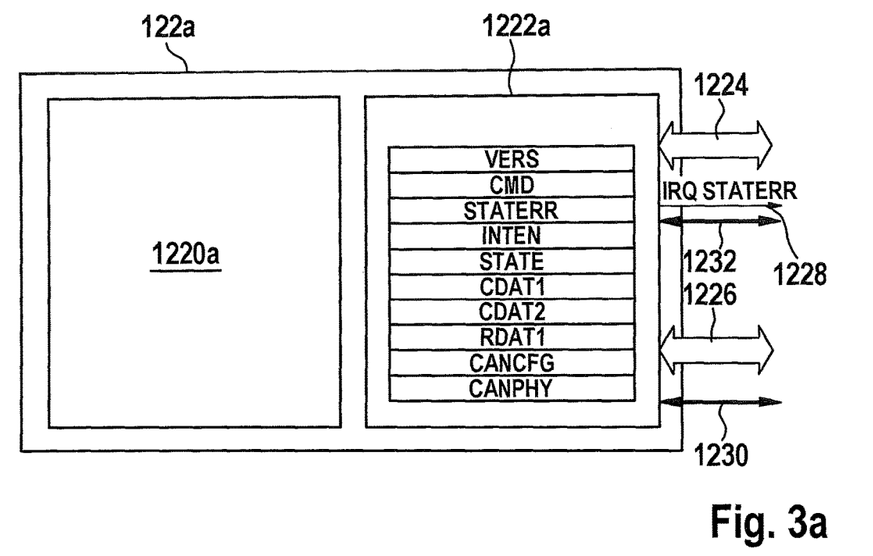
FIGS. 3a, 3b, 3c and 3d each schematically show aspects of a bus interface unit according to a further embodiment.

FIG. 3a schematically shows an aspect of bus interface unit 100a according to FIG. 2. It illustrates first functional block 122a, also referred to as "host service."

In an advantageous embodiment, for example, a finite state machine (FSM) 1220a can be implemented in first functional block 122a, which machine maps the various operating states of bus interface unit 100a and, in a manner known per se, controls operating state transitions or executes them under the control of the aforementioned control data and/or configuration data.

According to an embodiment, for example, finite state machine 1220a can have three states—"default," "ready", "running"—the first, "default" state being assumed, for example, after activation of finite state machine 1220a or of first functional block 122a. For example, finite state machine 1220a can be shifted from the first, "default" state into the second, "ready" state by the fact that bus control unit 110a (FIG. 2) is initialized or reset, which is possible as a result of the transmission of corresponding control data from external unit 2000 to control unit 120a or to first functional block 122a. Lastly, as a result of a start instruction that is likewise transferable from external unit 2000 to control unit 120a or to first functional block 122a, finite state machine 1220a can be shifted from the second, "ready" state into the third, "running" state. Analogously thereto, finite state machine 1220a can be shifted from the third, "running" state into the first, "default" state by way of a stop instruction that is likewise transferable from external unit 2000 to control unit 120a or to first functional block 122a.

Provision can additionally be made that in the "ready" and/or "running" operating states, configuration data of bus control unit 110a (e.g. for setting the bus timing for access to CAN bus 10a) and/or of the entire bus interface unit 100a (e.g. for configuring the data paths between units 100a, 2000) can be modified. For this as well, control unit 120a can obtain corresponding control data and/or configuration data from, for example, external unit 2000.

In an embodiment, in the third, "running" state bus control unit 110a is active in terms of data communication on CAN bus 10a, and consequently can receive and/or transmit CAN messages.

According to an embodiment when CAN bus control unit 110a is configured on the basis of the above-described "M_CAN IP module," control unit 120 can be configured, for example, to access memory registers or configuration registers of the M_CAN IP module, e.g. in order to write control data and/or configuration data obtained from external unit 2000 into CAN bus control unit 110a or into registers thereof.

In a further advantageous embodiment, a so-called host service handler 1222a can be provided in first functional block 122a, which handler is configured to furnish one or more of the following functionalities: data connection 1224 to external unit 2000, data connection 1226 to CAN bus control unit 110a, interrupt controller 1228, direct data connection 1230 to internal components of CAN bus control unit 110a, data connection 1232 for signaling status information.

In an advantageous embodiment, data connection 1224 to external unit 2000 can encompass, for example, one or more FPGA-internal data connections, e.g. in the case of Altera FGPAs F1 (FIG. 2), one or more so-called Avalon interfaces, for example the interface of the "Avalon Memory Mapped Interface" (Avalon-MM) type.

In an advantageous embodiment, data connection 1226 to CAN bus control unit 110a, in particular to AEI interface AEI (FIG. 2) of the M_CAN IP module, can encompass a linkage to the M_CAN multiplexer of the M_CAN IP module. In a further advantageous embodiment, the functionality of interrupt controller 1228 can encompass the output of interrupt request signals to external unit 2000. In a further advantageous embodiment, the direct data connection 1230 to internal components of CAN bus control unit 110a can be implemented via so-called bond-outs, i.e. via direct signal leadthroughs from CAN bus control unit 110a or from the apparatus implementing its function (hardware, in particular ASIC and/or IC and/or FPGA as discussed above). In a further advantageous embodiment, data connection 1232 for signaling status information can act, for example, directly on signaling devices (optical signal generator such as a light-emitting diode) or also on external unit 2000.

Figure 3B:
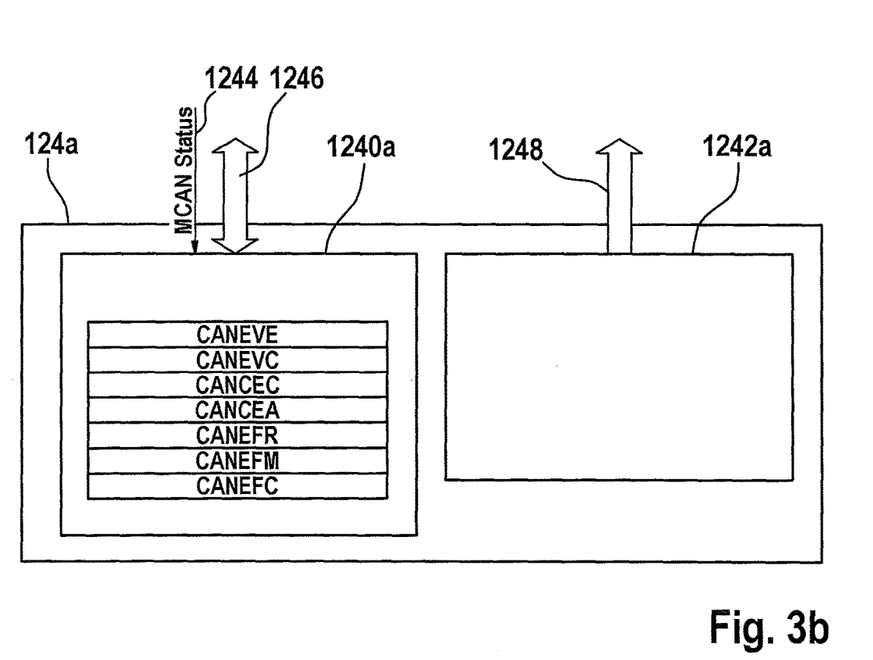

FIG. 3b schematically shows a further aspect of bus interface unit 100a according to FIG. 2. It illustrates a status and event server, abbreviated SES, that is represented in FIG. 3b by second functional block 124a.

By virtue of SES 124a, bus interface 100a is configured, in accordance with an embodiment, to receive from bus control unit 110a (FIG. 2) information characterizing an operating state of bus control unit 110a, and to output at least in part to external unit 2000 information characterizing the operating state of bus control unit 110a, the information characterizing the operating state of bus control unit 110a being temporarily stored in particular in control unit 120a, in the present case in particular in SES 124a.

In an embodiment, SES 124a has for this purpose a status and event handler (abbreviated SEH) that receives from bus controller 110a, via data connection 1244, information characterizing the operating state of bus control unit 110a, in particular status and event information of CAN bus controller 110a. In a further advantageous embodiment, data connection 1244, analogously to data connection 1230 described above, can be implemented directly to internal components of CAN bus control unit 110a via bond-outs.

In a further embodiment, SEH 1240*a* can be configured to receive and evaluate, in particular to filter, events and status changes of bus control unit 110*a*. As a function of the evaluation and/or filtering, SEH 1240*a* can execute or authorize further data transfers to external unit 2000, for example in order to inform external unit 2000 regarding the evaluation and/or filtering, or generally regarding the status and event information of CAN bus controller 110*a*. A data connection to external unit 2000 is implementable, for example, via data interface 1246. In an advantageous embodiment, data interface 1246 to external unit 2000 can encompass, for example, one or more FPGA-internal data connections, e.g. in the case of Altera FGPAs F1 (FIG. 2) one or more so-called Avalon interfaces, for example the interface of the "Avalon Mapped Memory Interface" (Avalon-MM) type, comparably to data interface 1224 between first functional block 122*a* ("host service") and external unit 2000. Thanks to the direct data connection 1246, the data to be sent to external unit 2000 can be transferred particularly efficiently to external unit 2000, in particular without software-controlled processes such as polling mechanisms or the like. Instead, when unit 100*a* is implemented in hardware or by way of the functionality of FPGA F1, it is possible for (which may be exclusively) hardware-based and therefore high-performance data communication to occur, the individual process phases of which are in particular also deterministic, i.e. have a predictable duration.

In a further embodiment SES 124*a* can also have a so-called "SES ingress handler" represented by functional block 1242*a* in FIG. 3*b*, which handler possesses a (dedicated) data connection 1248 to external unit 2000. In an exemplary embodiment, provision is made that SES ingress handler 1242*a* is configured to exchange data with external unit 2000 in the form of one or more data segments, in particular data segments of constant length. This makes possible a deterministic run time or processing time for the data segments in external unit 2000. SES ingress handler 1242*a* can furthermore be configured to perform an arbitration of data transfer requests that are directed to it from SEH 1240*a*, for example in order to transfer the aforementioned status and event information of CAN bus controller 110*a*, or data derived therefrom, from SEH 1240*a* to external unit 2000.

Particularly, in an embodiment SES 124*a* can transfer data to external unit 2000 via data connection 1246 and/or via data connection 1248 of SES ingress handler 1242*a*, data transfer via data connection 1248 occurring in particular in the form of data segments of constant length.

Figure 3C:
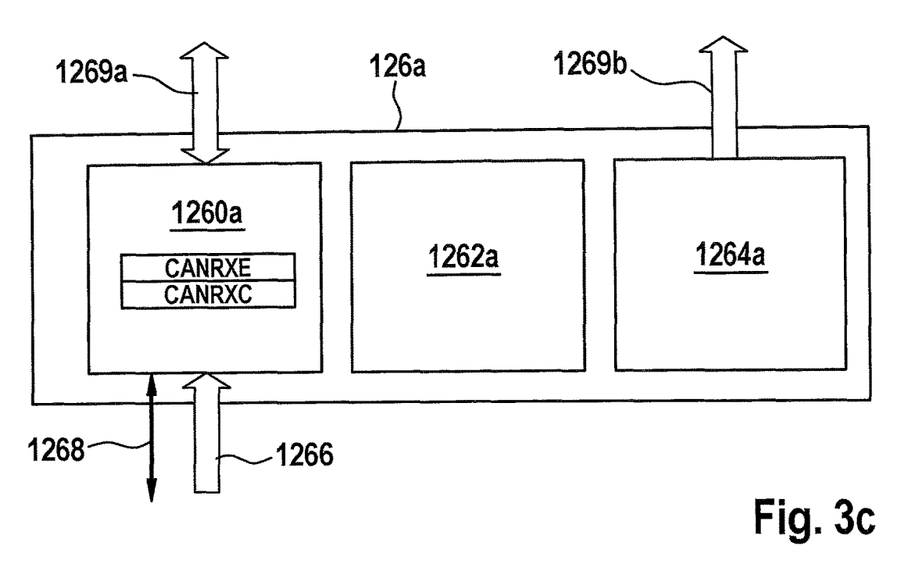

FIG. 3*c* schematically shows a further aspect of bus interface unit 100*a* according to FIG. 2. It illustrates a reception queue processor 126*a*, abbreviated RQP 126*a*. Reception queue processor 126*a* has an input buffer handler (abbreviated RFH) 1260*a*. RQP 126*a* furthermore has, according to an embodiment, a local buffer memory 1262*a*. RQP 126*a* furthermore has, according to an embodiment, a local input coordinator 1264*a*.

According to an embodiment, RFH 1260*a* has a data connection 1266 that is configured to accept, through bus control unit 110*a*, data received from CAN bus 10*a* or data derived therefrom. In addition to data from other senders (other CAN bus subscribers, not shown) received from CAN bus 10*a*, these can also be data sent out from bus control unit 110*a* onto CAN bus 10*a* and also simultaneously received again by bus control unit 110*a* ("self-reception"). In an embodiment, for more efficient and higher-performance process control, RFH 1260*a* can also possess a direct data connection 1268 to CAN bus control unit 110*a*, for example once again implemented via bond-outs.

According to a further embodiment, RFH 1260*a* has a data connection 1269*a* that is configured to enable data exchange with external unit 2000. In an advantageous embodiment, data connection 1269*a* to external unit 2000 can encompass, for example, one or more FPGA-internal data connections, e.g. in the case of Altera FGPAs F1 (FIG. 2), one or more so-called Avalon interfaces, for example the interface of the "Avalon Memory Mapped Interface" (Avalon-MM) type, comparably to data interfaces 1224 and 1246 described above.

In an embodiment in which SES 124*a* has a local ingress handler 1264*a*, this local ingress handler 1264*a* can possess a (dedicated) data connection 1269*b* to external unit 2000. In an exemplary embodiment provision is made that local ingress handler 1264*a* is configured to exchange data with external unit 2000 in the form of one or more data segments, in particular data segments of constant length. This makes possible a deterministic run time or processing time for the data segments in external unit 2000. Local ingress handler 1264*a* can furthermore be configured to perform arbitration of data transfer requests that are directed to it from RFH 1260*a*, for example in order to transfer the aforementioned received CAN messages or data, or data derived therefrom, from RFH 1260*a* to external unit 2000.

In an embodiment, reception queue processor (RQP) 126*a* is configured to execute the following steps when a CAN message is to be transferred to external unit 2000: load the CAN message (which may be in its entirety (header data and payload data)) from a memory 118*a* (FIG. 2) of bus control unit 110*a* into local buffer memory 1262*a*; and authorize a data transfer of the CAN message from local buffer memory 1262*a* to external unit 2000, which may be under the control of local ingress handler 1264*a* and using its data connection 1269*b* to external unit 2000.

In an embodiment, memory 118*a* of bus control unit 110*a* can be configured as an external memory (see block 118*a* of FIG. 2). In particular, memory 118*a* can be configured as a so-called "dual-ported" memory, which may be a dual-ported random access memory (RAM), having a data bus width of, for example, 32 bits or 64 bits.

Figure 3D:
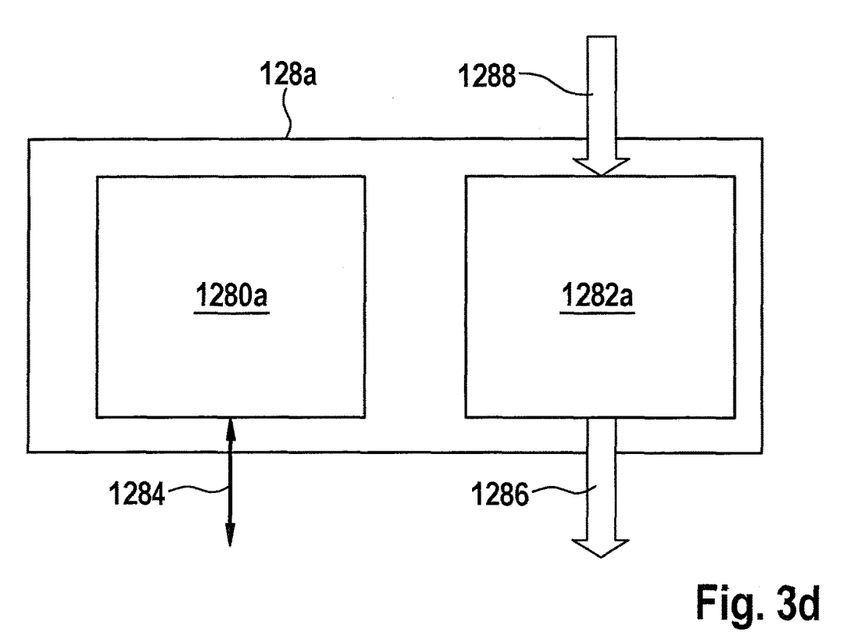

FIG. 3*d* schematically shows a further aspect of bus interface unit 100*a* according to FIG. 2. It illustrates a transmission queue processor (abbreviated TQP) 128*a*. Transmission queue processor 128*a* has a transmission queue handler (abbreviated TQH) 1280*a*. According to an embodiment, TQP 128*a* further has a local output handler 1282*a*.

According to an embodiment, TQH 1280*a* has a direct data connection 1284 to bus control unit 110*a*, which enables TQH 1280*a* to control or modify control data and/or configuration data or registers of bus control unit 110*a*. TQH 1280*a* can thereby, for example, also manage the transmission queue of bus control unit 110*a* or influence the processing thereof by bus control unit 110*a*. The "self-reception" function of bus control unit 110*a* can also be controlled by TQH 1280*a* by virtue of data connection 1284. Thanks to the provision of TQH 1280*a* it is in fact possible in some application instances to dispense with the use of a transmission queue processor integrated into bus control unit 110*a*; control can be effected instead by TQH 1280*a* itself.

Local output handler 1282*a* of TQP 128*a* is connectable via a data connection 1286 to memory 118*a* of bus control unit 110*a*, so that local output handler 1282*a* can write into memory 118*a*, via this data connection 1286, data that are to be sent out by bus control unit 110*a* on CAN bus 10*a* in the form of CAN messages. Bus control unit 110*a* can, in a manner known per se, accept such data from memory 118*a* and transmit them on CAN bus 10*a*.

Local output handler 1282*a* of TQP 128*a* is furthermore connectable to external unit 2000 via a data connection 1288, by way of which local output handler 1282*a* can receive from external unit 2000, e.g. in the form of data segments of constant length, those data which are to be sent out via bus control unit 110*a* onto CAN bus 10*a* in the form of CAN messages.

In an exemplary embodiment, transmission queue processor (TQP) 128*a* is configured to convert data obtained from external unit 2000 via data connection 1288 into CAN messages, which may be in real time, for example by adapting the header data, and to write the CAN messages thereby generated into memory 118*a*, in particular via data connection 1286. Data connection 1286 may have for this purpose the following properties: data throughput of 64 bits per clock cycle, and/or highest possible priority in the context of memory accesses to memory 118*a*, and/or arbitration for memory access within a clock cycle.

In a further embodiment, TQP 128*a* can also be configured to block CAN messages that are present in memory 118*a* for transmission via CAN bus 10*a* (for example, in order to prevent overwriting) until all the necessary processing steps have executed (e.g. transmission by bus control unit 110*a*, handling of "self-reception," confirmation by reception queue processor (RQP) 126*a*).

In a further embodiment of bus interface unit 100*a*, an MCAN multiplexer 112*a* (FIG. 2) can be provided, by way of which first functional block 122*a* (also referred to as "host service") is connectable by way of its data connection 1226 to bus control unit 110*a*, in particular its AEI interface.

In a further embodiment of bus interface unit 100*a*, a first arbitration unit 114*a* can be provided which is connectable via an AEIM interface to bus control unit 110*a*, and which is further connected to memory 118*a*. Bus control unit 110*a* can consequently access external memory 118*a* via first arbitration unit 114*a*. A further data connection (not further characterized) can additionally be provided between components 112*a*, 114*a*.

In a further embodiment of bus interface unit 110*a*, a second arbitration unit 116*a* can be provided, which unit controls accesses by components 126*a*, 128*a* (via their data connections 1266, 1286) to memory 118*a*. Second arbitration unit 116*a* is connected, for example, to a second port of memory 118*a* that may be configured as a dual-port RAM, while first arbitration unit 114*a* is connected to a first port of memory 118*a*. Accesses to memory 118*a* can thus occur simultaneously from one member each of the following groups of components: Group 1 (110*a*, 122*a*), Group 2 (126*a*, 128*a*).

In a further embodiment of bus interface unit 100*a*, a third arbitration unit 117*a* can be provided which controls accesses by components 124*a*, 126*a* (via their data connections 1248, 1269*b*) on a data path 117*a*' to external unit 2000.

In a further embodiment of bus interface unit 100*a*, a multiplexer unit 111 can be provided which controls data accesses via data connections 1224, 1269*a* on data path 111' to external unit 2000. For example, a multiplexer unit 111 of the Avalon type can be used, for example when FPGA F1 is a model manufactured by Altera.

In a further embodiment, data connections 1248, 1269*b*, 117*a*', 1288 each have a data width of 64 bits, so that 8 bytes of data can thus be transferred simultaneously for each clock cycle. One or more control leads can additionally be present.

Bus interface unit 100*a* according to FIG. 2 possesses the following particular advantages: Thanks to the provision of components 122*a*, 124*a*, operating state information, event information, and status information of bus control unit 110*a* can be transferred efficiently, and in particular without blockage, to external unit 2000, for example by the fact that said information can be transferred, as described above, via data connection 1246 to the external unit. Such transfers can advantageously occur in a continuous data stream to external unit 2000, in particular with no need to check confirmation signals of external unit 2000 for the reception of data. External unit 2000 and/or another external controller or the like (not shown) can advantageously access bus control unit 110*a* via host service 122*a*, so that, for example, software-controlled access as implemented in conventional microcontrollers is superfluous. Instead, bus interface unit 100*a*, which may be implemented in hardware or in the form of an FPGA F1, can quickly and efficiently access bus control unit 110*a*. The configuration according to the present invention of FIG. 2 and following furthermore advantageously enables arbitration between configuration accesses and data accesses to bus control unit 110*a*. For example, configuration data of bus control data 110*a* can be modified, by way of the above-described bond-out connections, directly in bus control unit 110*a*, while data accesses (reading/writing of CAN messages or parts thereof (header, payload)) can be effected entirely independently thereof via components 126*a*, 128*a*. In addition, no interrupt mechanism or polling mechanism is necessary in order to direct status information or events, or other data characterizing an operating state of bus control unit 110*a*, to external unit 2000. Bus interface unit 100*a* can instead itself detect the presence of such information (for example, an interrupt request of bus control unit 110*a* can be sent directly to unit 126*a*), and initiate a corresponding data transfer to external unit 2000. It is moreover conceivable for the known "M_CAN IP module" to be reduced in terms of its functionality (and thus also its size or memory requirement, or gate equivalents, etc.), so long as comparable functions, or functions improved according to the present invention, are taken over by the remaining components of bus interface unit 100*a* according to the present invention.

Figure 4:
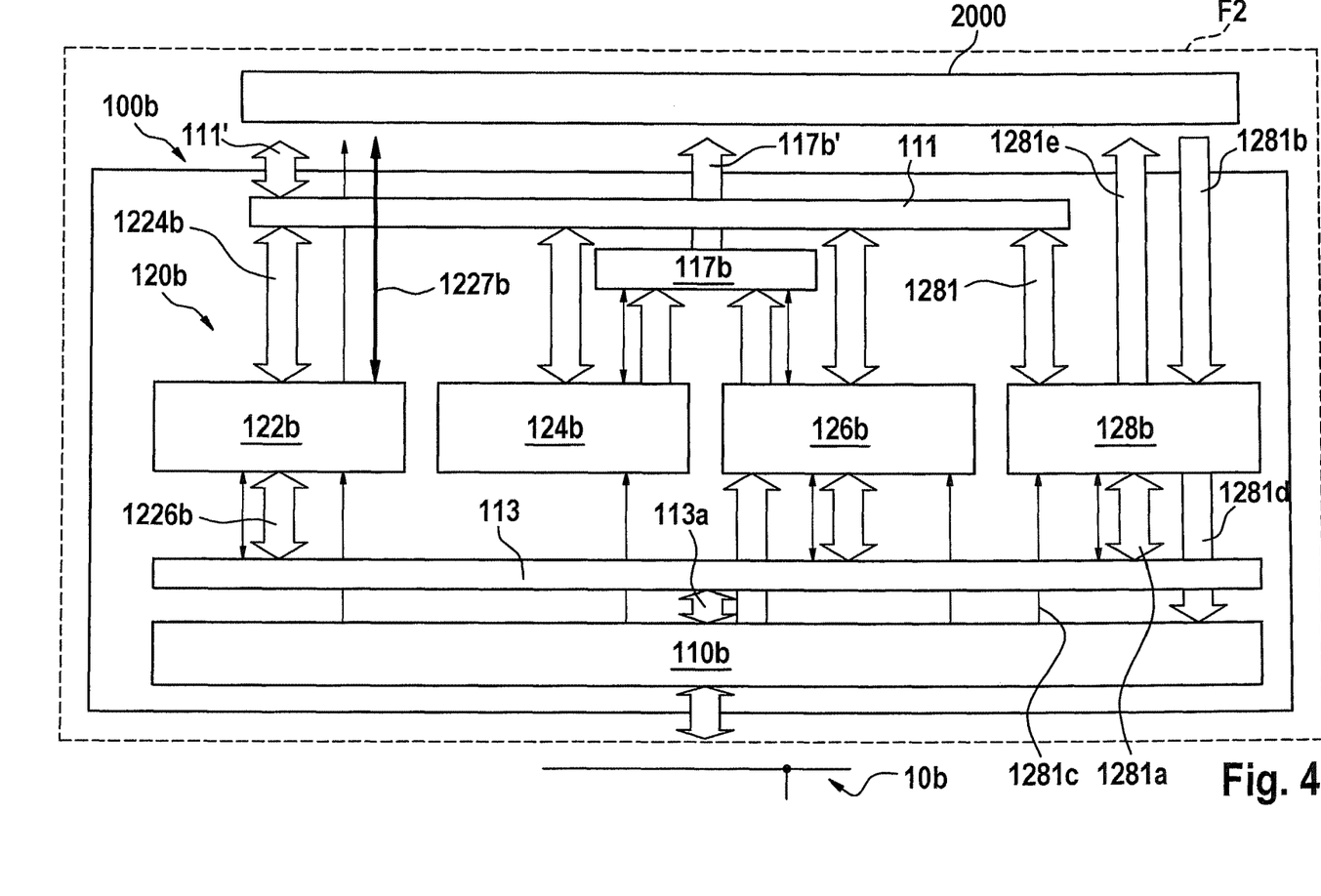
FIG. 4 schematically shows a bus interface unit according to a further embodiment.

FIG. 4 schematically shows a bus interface unit 100*b* in accordance with a second embodiment. Bus interface unit 100*b* is connected to a bus system 10*a* configured as a FlexRay bus, and is configured to output data received via bus control unit 110*b* from FlexRay bus 10*b*, and/or data derived therefrom, to external unit 2000, and/or to output data obtained from external unit 2000, and/or data derived therefrom, via bus control unit 110*b* to FlexRay bus 10*b*. Data exchange between bus interface unit 100*b* and external unit 2000 is indicated in FIG. 4 by multiple arrows 1227*b* and block arrows 111', 117*b*', 1281*b*, 1281*e*, and is described in further detail below.

Bus control unit 110*b* of bus interface unit 100*b* is implemented in the present case on the basis of the "E-Ray IP module" of Robert Bosch GmbH already described above, which is configured to perform communication on a FlexRay bus system 10*b*. Alternatively, a different FlexRay controller 110*b* can also be used. The functionality of the E-Ray IP module, and in particular of the entire bus interface unit 110*b*, may be implemented particularly in the form of part of a field programmable gate array (FPGA) F2; in the present case FPGA F2 also implements at least in part the functionality of external unit 2000. This is indicated in FIG. 4 by the dashed line, labeled with the reference character F2, around units 100*b*, 2000. Integration of both bus interface unit 100*b* and external unit 2000 in the same FPGA F2 yields particularly efficient possibilities for data transfer between units 100b, 2000, since FPGA-internal bus systems and data transfer systems can, for example, be utilized. In the case of FPGA models manufactured by Altera, for example, the so-called Avalon interfaces of Altera FPGAs, which enable efficient data connection among multiple components or units disposed in the same FPGA F2, can be utilized. It may particularly be the case to use in the context of FPGA F2, for example, the interface of the "Avalon Memory Mapped Interface" type in order to establish a data connection between parts of units 100b, 2000.

In the configuration illustrated in FIG. 4, the functionality of control unit 120b according to the present invention (see also reference character 120 of FIG. 1) is distributed among several functional blocks, namely substantially functional blocks 122b, 124b, 126b, 128b, which will be explained in further detail below.

In an advantageous embodiment, functional block 122b, which (analogously to functional block 122a of CAN bus interface element 100a according to FIG. 2) can also be referred to as "host service" and is configured to control an operating mode of FlexRay bus interface unit 100b according to FIG. 4, is provided. In particular, functional block 122b can be configured to receive control data and/or configuration data from external unit 2000, thereby rendering control unit 120b according to the present invention capable of conveying the control data and/or configuration data directly to bus control unit 110b, in particular independently of or in a manner decoupled from a further operating mode of external unit 2000. The control data and/or configuration data can in that fashion be conveyed to bus control unit 110b, for example, in those operating states in which data communication via FlexRay bus 10b experiences particularly little impairment due to the transfer of control data and/or configuration data.

According to an embodiment, the aforesaid control data can encompass, for example, control instructions that initiate a start or a shutdown/deactivation of bus control unit 110b, and/or another change between operating states of bus control unit 110b.

Figure 5A:
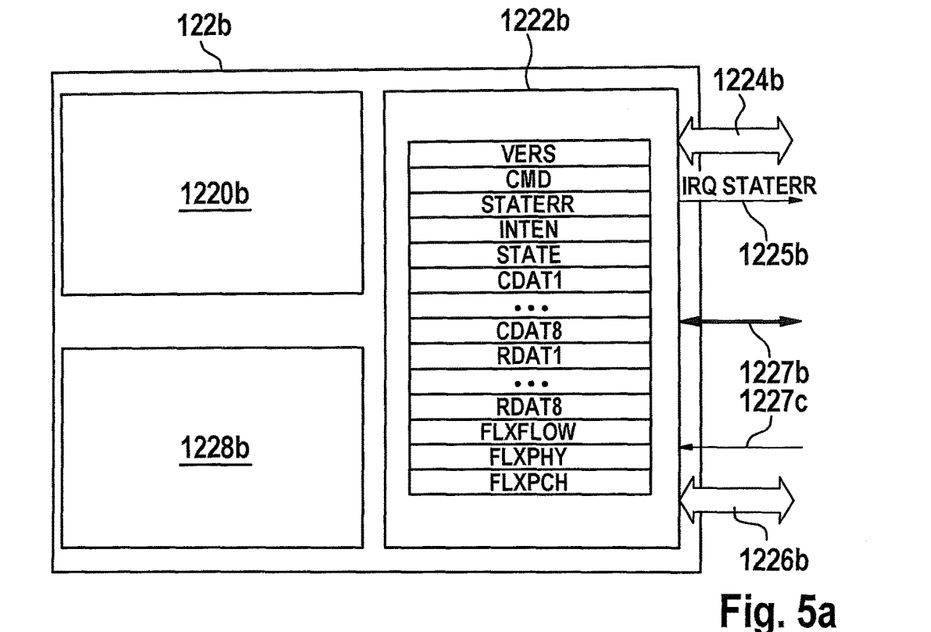
FIGS. 5a, 5b, 5c and 5d each schematically show aspects of a bus interface unit according to a further embodiment.

FIG. 5a schematically shows an aspect of bus interface unit 100b according to FIG. 4. It illustrates first functional block 122b, also referred to as "host service."

In an advantageous embodiment, for example, a finite state machine (FSM) 1220b can be implemented in the "host service" functional block 122b, which machine maps the various operating states of bus interface unit 100b and, in a manner known per se, controls operating state transitions or executes them under the control of the aforementioned control data and/or configuration data. For example, finite state machine 1220b can have three states ("default," "ready", "running"), comparable to those of finite state machine 1220a already described above.

According to an embodiment, when FlexRay bus control unit 110b is configured on the basis of the above-described "E-Ray IP module," control unit 120b can be configured, for example, to access memory registers or configuration registers of the E-Ray IP module, e.g. in order to write control data and/or configuration data obtained from external unit 2000 into FlexRay bus control unit 110b or into registers thereof.

In a further advantageous embodiment, a so-called host service handler 1222b can be provided in functional block 122b according to FIG. 5a, which handler is configured to furnish one or more of the following functionalities: data connection 1224b to external unit 2000, data connection 1226b to FlexRay bus control unit 110b, interrupt controller 1225b, data connection 1227b for exchanging, in particular, status information regarding a bit transfer layer (layer 1 (phy layer) of the ISO/OSI basic reference model) with external unit 2000, data connection 1227c for exchanging, in particular receiving, status information of FlexRay bus control unit 110b.

In an advantageous embodiment, data connection 1224b to external unit 2000 can encompass, for example, one or more FPGA-internal data connections, e.g. in the case of Altera FGPAs F2 (FIG. 4), one or more so-called Avalon interfaces, for example the interface of the "Avalon Memory Mapped Interface" (Avalon-MM) type.

In an advantageous embodiment, data connection 1226b to FlexRay bus control unit 110b can encompass a linkage to an E-Ray arbitration unit 113, multiple further data connections being couplable via arbitration unit 113 to an E-Ray data path 113a. Arbitration unit 113 may operate in such a way that an arbitration is performed on the basis of task granularity and not on the basis of access granularity. In a further embodiment this also applies to one or more arbitration units 114a, 116a, 117a of the variant according to FIG. 2.

In a further advantageous embodiment the functionality of interrupt controller 1225b can encompass the output of interrupt request signals to external unit 2000.

In a further advantageous embodiment, the functionality of a so-called "interface sequencer" can be integrated into the "host service" functional block 122b, said sequencer being configured to execute, in particular independently of data connection 1226b, one or more of the following accesses to FlexRay bus control unit 110b: chicmd (apply E-Ray CHI command), do_unlock (apply E-Ray unlock sequence), do_write (process CONF_WRITE_REG command), do_read (process CONF_READ_REG command), do_mbuf (process (CONF_MBUF command).

The operation of functional block 122b can also be controlled by a finite state machine 1228b. Finite state machine 1228b can in particular also be configured, for example, to process, e.g. using functional block 1222b, control instructions and/or configuration instructions obtained from external unit 2000. Finite state machine 1228b may furthermore be configured to control E-Ray arbitration unit 113 in order to enable interrupt-free access to E-Ray data connection 113a (FIG. 4).

Figure 5B:
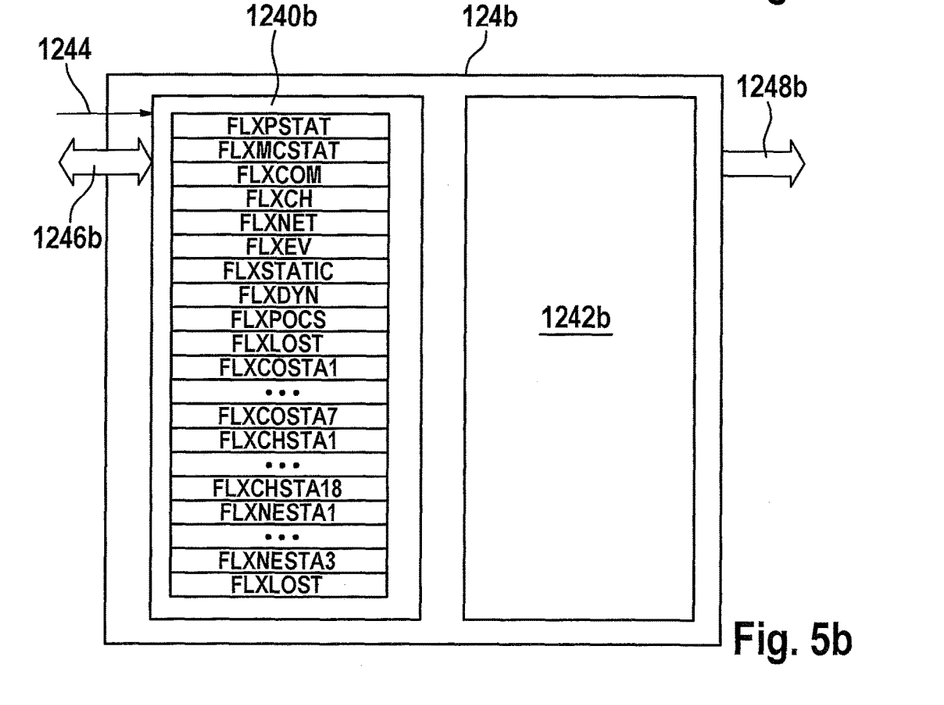

FIG. 5b schematically shows a further aspect of bus interface unit 100b according to FIG. 4. It illustrates a status and event server, abbreviated SES, that is represented in FIG. 5b by second functional block 124b.

By virtue of SES 124b, bus interface 100b is configured, in accordance with an embodiment, to receive from bus control unit 110b (FIG. 4) information characterizing an operating state of bus control unit 110b, and to output at least in part to external unit 2000 information characterizing the operating state of bus control unit 110b, the information characterizing the operating state of bus control unit 110b being temporarily stored in particular in control unit 120b, in the present case in particular in SES 124b.

In an embodiment, SES 124a has for this purpose a status and event handler (abbreviated SEH) 1240b that receives from bus controller 110b, via data connection 1244, information characterizing the operating state of bus control unit 110a, in particular status and event information of FlexRay bus controller 110b.

In a further embodiment, SEH 1240b can be configured to receive and evaluate, in particular to filter, events and status changes of bus control unit 110b. As a function of the evaluation and/or filtering, SEH 1240b can execute or authorize further data transfers to external unit 2000, for example in order to inform external unit 2000 regarding the evaluation and/or filtering, or generally regarding the status and event information of FlexRay bus controller 110b. A data connection to external unit 2000 is implementable, for example, via data interface 1246b. In an advantageous embodiment, data interface 1246b to external unit 2000 can encompass, for example, one or more FPGA-internal data connections, e.g. in the case of Altera FGPAs F2 (FIG. 4) one or more so-called Avalon interfaces, for example the interface of the "Avalon Mapped Memory Interface" (Avalon-MM) type. Thanks to the direct data connection 1246b, the data to be sent to external unit 2000 can be transferred particularly efficiently to external unit 2000, in particular without software-controlled processes such as polling mechanisms or the like. Instead, when unit 100b is implemented in hardware or by way of the functionality of FPGA F2, it is possible for (which may be exclusively) hardware-based and therefore high-performance data communication to occur, the individual process phases of which are in particular also deterministic, i.e. having a predictable duration.

In a further embodiment SES 124b can also have a so-called "SES ingress handler" represented by functional block 1242b in FIG. 5b, which possesses a (dedicated) data connection 1248b to external unit 2000. In an exemplary embodiment, provision is made that SES ingress handler 1242b is configured to exchange data with external unit 2000 in the form of one or more data segments, in particular data segments of constant length. This makes possible a deterministic run time or processing time for the data segments in external unit 2000. SES ingress handler 1242b can furthermore be configured to perform an arbitration of data transfer requests that are directed to it from SEH 1240b, for example in order to transfer the aforementioned status and event information of FlexRay bus controller 110b, or data derived therefrom, from SEH 1240b to external unit 2000.

Particularly, in an embodiment SES 124b can transfer data to external unit 2000 via data connection 1246b and/or via data connection 1248b of SES ingress handler 1242b, data transfer via data connection 1248b occurring in particular in the form of data segments of constant length.

Figure 5C:
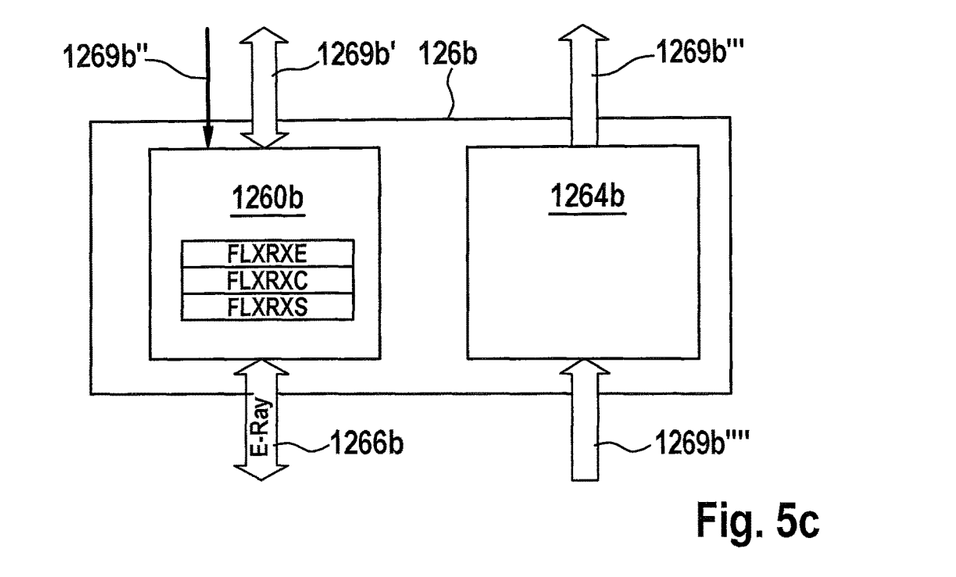

FIG. 5c schematically shows a further aspect of bus interface unit 100b according to FIG. 4. It illustrates a reception queue processor 126b, abbreviated RQP. Reception queue processor 126b has an input buffer handler (abbreviated RFH) 1260b. RQP 126b furthermore has, according to an embodiment, a local ingress handler 1264b.

According to an embodiment, RFH 1260b has a data connection 1266b that is configured to accept, through bus control unit 110b, data received from FlexRay bus 10b or data derived therefrom, and/or to transfer to bus control unit 110b data to be sent out via FlexRay bus 10b. In addition to data from other senders (other bus subscribers, not shown) received from CAN bus 10b, these can also be data sent out from bus control unit 110b onto FlexRay bus 10b and also simultaneously received again by bus control unit 110b ("self-reception").

According to a further embodiment, RFH 1260b has a data connection 1269b' that is configured to enable data exchange with external unit 2000. In an advantageous embodiment, data connection 1269b' to external unit 2000 can encompass, for example, one or more FPGA-internal data connections, e.g. in the case of Altera FGPAs F2 (FIG. 4), one or more so-called Avalon interfaces, for example the interface of the "Avalon Memory Mapped Interface" (Avalon-MM) type.

RFH 1260b can furthermore possess a data connection 1269b'' for receiving status information or state information and the like of bus control unit 110b.

In an embodiment in which SES 124b has a local ingress handler 1264b, this local ingress handler 1264b can possess a (dedicated) data connection 1269b''' to external unit 2000. In an exemplary embodiment provision is made that local ingress handler 1264b is configured to exchange data with external unit 2000 in the form of one or more data segments, in particular data segments of constant length. This makes possible a deterministic run time or processing time for the data segments in external unit 2000. Local ingress handler 1264b can furthermore be configured to perform arbitration of data transfer requests that are directed to it from RFH 1260b, for example in order to transfer the aforementioned received FlexRay messages or data, or data derived therefrom, from RFH 1260b to external unit 2000.

Via a further data connection 1269b'''', ingress handler 1264b can advantageously access an output buffer of bus control unit 110b, which may be by way of a direct memory access (DMA).

In an embodiment, reception queue processor (RQP) 126b is configured to execute the following steps when a FlexRay message is to be transferred to external unit 2000: load the message from an E-Ray message buffer (not shown) into the output buffer of bus control unit 110b; read header data of the relevant message, which may be via data connection 1266b (which may have a data width or bus width of 32 bits); and authorize a data transfer of the FlexRay message to external unit 2000, such that during the data transfer (in particular of the header data), the payload data of the relevant message are read in real time by way of a DMA access directly from the output buffer of bus control unit 110b and are transferred via data connection 1269b''' to external unit 2000. Local temporary storage of the payload data is thereby advantageously avoided.

Figure 5D:
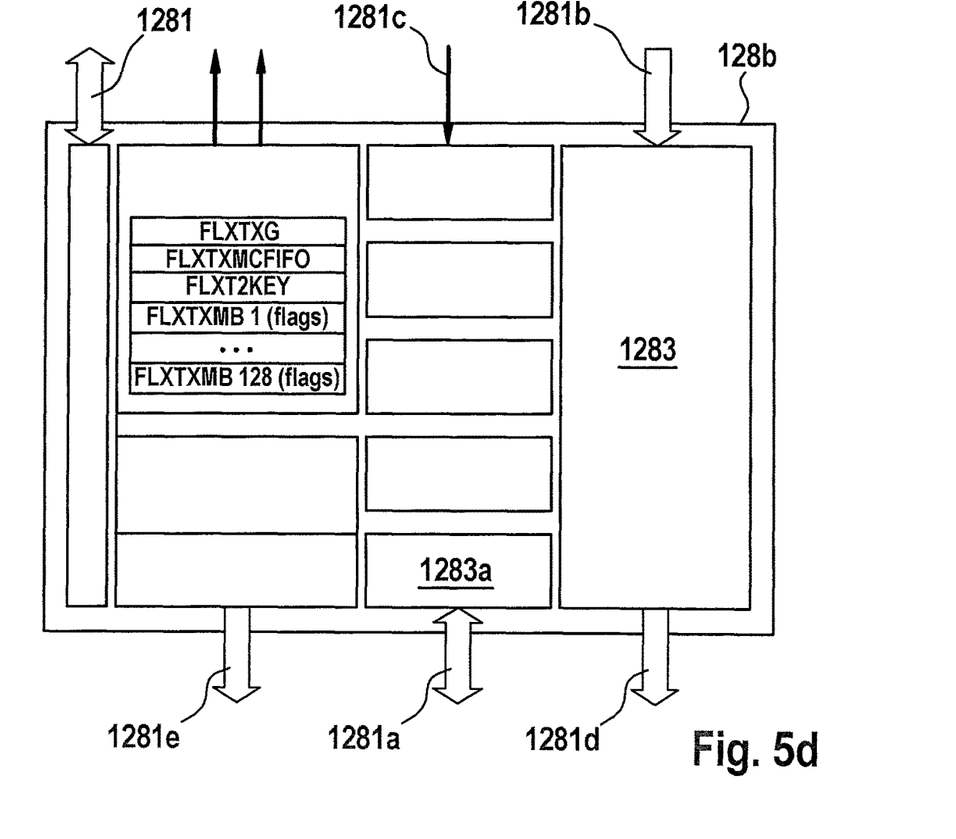

FIG. 5d schematically shows a further aspect of bus interface unit 100b according to FIG. 4. It illustrates a transmission queue processor (abbreviated TQP) 128b. Transmission queue processor 128b has a data connection 1281 to external unit 2000 which may be implementable in the form of an Avalon interface. A data connection between transmission queue processor 128b and bus control unit 110b, optionally via arbitration unit 113 (FIG. 4), is labeled with the reference character 1281a. A further data connection that enables the transmission of data from external unit 2000 to transmission queue processor 128b (which may be in the form of data segments of constant length) is labeled with the reference character 1281b. Status information, operating state information, and the like can be delivered to transmission queue processor 128b from bus control unit 110b via further data connection 1281c. A further data connection that enables the transfer of data by transmission queue processor 128b into an input buffer (not shown) of bus control unit 110b, which may be using DMA accesses, is labeled with the reference character 1281d.

The operation of transmission queue processor 128b in accordance with an embodiment is described in further detail below with reference to the block diagram of FIG. 5d. An output processor 1283 obtains via data connection 1281b, which may be in the form of data segments of constant length, data that are to be outputted by bus control unit 110b onto FlexRay bus 10b in the form of FlexRay messages. Output processor 1283 may temporarily store header data for the FlexRay messages locally, while payload data for the FlexRay messages may be written directly, upon input via data connection 1281*b* by way of a DMA access via data connection 1281*d*, in to an input buffer (not shown) of bus control unit 110*b*. As soon as the payload data for at least one FlexRay message are present in their entirety, output processor 1283 authorizes a buffer memory processor 1283*a* to perform a data transfer from the input buffer of bus control unit 110*b* into a message RAM of bus control unit 110*b*. A corresponding data communication can be accomplished, for example, via data connection 1281*a* that may have a data width of 32 bits.

In a further embodiment a further data connection 1281*e* can be provided between transmission queue processor 128*b* and external unit 2000. This makes it possible, for example, to achieve synchronization between components 128*b*, 2000. A further possibility that exists thanks to data connection 1281*e*, which is implementable e.g. using an Avalon interface, is that transmission queue processor 128*b* can inform external unit 2000 as to whether and/or when a free slot for transmission of a FlexRay message by bus control unit 110*b* is available on FlexRay bus 10*b*.

In a further embodiment, data connections 117', 1281*b* each have a data width of 64 bits, so that 8 bytes of data can thus be transferred simultaneously for each clock cycle. One or more control leads can additionally be present.

The principle according to the present invention advantageously allows existing bus control units, e.g. CAN controllers and FlexRay controllers, to be enhanced with the functionalities described above.

What is claimed is:

1. A bus interface unit for exchanging data via a bus system, comprising:
   at least one bus control unit for connection to the bus system, the at least one bus control unit including:
      a first memory to store message data received from the bus system and message data to be transmitted onto the bus system; and
      a second memory to store control data and/or configuration data separate from the message data received from the bus system and the message data to be transmitted onto the bus system; and
   a control unit connected to the at least one bus control unit, the control unit including a third memory to receive from the first memory the message data received from the bus system, the control unit configured to:
      output from the third memory the message data received by the bus control unit from the bus system to a processor external to the bus interface unit, and to output to the first memory the message data to be transmitted onto the bus system obtained from the processor; and
      receive the control data and/or configuration data from the processor, and convey the received control data and/or configuration data to the second memory of the at least one bus control unit, the control data and/or configuration data including instructions from the processor to control and/or configure a transition between operating states and/or execution of the operating states of the at least one bus control unit;
   wherein at least one of the following is satisfied:
      a. the bus system is a Controller Area Network ("CAN") bus system, and the bus control unit is a CAN bus controller;
      b. the bus system is a FlexRay bus system, and the bus control unit is a FlexRay bus controller; and
      c. the bus system is a Local Interconnect Network ("LIN") bus system, and the bus control unit is a LIN bus controller;
   wherein the control unit is configured to directly access registers of the bus control unit and directly write into the registers of the bus control unit the received control data and/or registration data, and is implemented in one of an application specific integrated circuit (ASIC) or a field programmable gate array (FPGA).

2. The bus interface unit of claim 1, wherein the control unit is configured to exchange data with the processor in the form of one or more data segments.

3. The bus interface unit of claim 1, wherein the control unit includes a fourth memory to receive information characterizing an operating state of the bus control unit from the bus control unit, and the control unit is configured to output the information characterizing the operating state of the bus control unit from the fourth memory to the processor.

4. The bus interface unit of claim 1, wherein the control unit is implemented as hardware.

5. The bus interface unit of claim 1, wherein the control unit is configured to exchange data with the processor in the form of one or more data segments, which include data segments of constant length.

6. The bus interface unit of claim 1, wherein the control unit conveys the received control and/or configuration data to the at least one bus control unit independent of operation of the processor.

7. The bus interface unit of claim 1, wherein the control and/or configuration data includes control instructions to initiate at least one of: a start of the at least one bus control unit, a shutdown of the at least one bus control unit, or a change between operating states of the at least one bus control unit.

8. The bus interface unit of claim 1, wherein the control and/or configuration data includes configuration data to configure at least one of: a timing for access by the at least one bus control unit to the bus system, or a data path between the control unit and the external unit.

9. The bus interface unit of claim 1, wherein the control unit communicates with the processor via a second bus system.

10. The bus interface unit of claim 1, wherein the at least one bus control unit and the control unit are included in a single integrated circuit.

11. The bus interface unit of claim 1, wherein the control unit includes a finite state machine to control the operating state of the at least one bus control unit in response to the control and/or configuration data.

12. A method for operating a bus interface unit for exchanging data via a bus system, the bus interface unit including at least one bus control unit for connection to the bus system and a control unit connected to the at least one bus control unit, the method comprising:
   receiving, by the bus control unit, message data from the bus system, and storing, by a first memory of the bus control unit, the message data received from the bus system;
   outputting, by the control unit, (i) the message data received by the bus control unit from the bus system and stored in the first memory of the bus control unit, and/or data derived therefrom, to a processor external to the bus interface unit; and (ii) message data obtained from the processor, and/or data derived therefrom, to the bus control unit for transmission onto the bus system; and receiving, by the control unit, control data and/or configuration data received from the processor, the control data and/or configuration data being separate from the message data obtained from the processor, and conveying the received control data and/or configuration data to a second memory of the at least one bus control unit to control and/or configure a transition between operating states and/or an execution of the operation states of the at least one bus control unit as a function of the received control data and/or configuration data;

wherein at least one of the following is satisfied:
   a. the bus system is a Controller Area Network ("CAN") bus system, and the bus control unit is a CAN bus controller;
   b. the bus system is a FlexRay bus system, and the bus control unit is a FlexRay bus controller; and
   c. the bus system is a Local Interconnect Network ("LIN") bus system, and the bus control unit is a LIN bus controller; and
   wherein the control unit directly accesses registers of the bus control unit and directly writes into the registers of the bus control unit the received control data and/or registration data, and is implemented in one of an application specific integrated circuit (ASIC) or a field programmable gate array (FPGA).

13. The method of claim 12, wherein the control unit exchanges data with the processor in the form of one or more data segments, in particular data segments of constant length.

14. The method of claim 12, wherein the control unit receives information characterizing an operating state of the bus control unit from the bus control unit, and outputs the information characterizing the operating state of the bus control unit at least in part to the processor, the information characterizing the operating state of the bus control unit being temporarily stored in the control unit.

15. The method of claim 12, wherein the control unit exchanges data with the processor in the form of one or more data segments, which are data segments of constant length.

\* \* \* \* \*